Jan. 2, 1968   D. A. C. DE RYCKE ETAL   3,361,525
MANUFACTURE OF OXIDES OF THE ELEMENTS
TITANIUM, ZIRCONIUM, IRON, ALUMINUM
AND SILICON
Filed Oct. 31, 1962   3 Sheets-Sheet 1

INVENTORS
D. A. C. DE RYCKE +
BY   W. N. DEAR

Holcombe, Wetherill & Brisebois
ATTORNEYS

Jan. 2, 1968 D. A. C. DE RYCKE ET AL 3,361,525
MANUFACTURE OF OXIDES OF THE ELEMENTS
TITANIUM, ZIRCONIUM, IRON, ALUMINUM
AND SILICON
Filed Oct. 31, 1962 3 Sheets-Sheet 2

INVENTORS
D. A. C. DE RYCKE +
BY W. N. DEAR
Holcombe, Wetherill & Brisebois
ATTORNEYS

United States Patent Office 3,361,525
Patented Jan. 2, 1968

3,361,525
MANUFACTURE OF OXIDES OF THE ELEMENTS TITANIUM, ZIRCONIUM, IRON, ALUMINUM AND SILICON
Douglas August Charles De Rycke, Woolton, Liverpool, and William Noel Dear, Grimsby, England, assignors to Laporte Titanium Limited, London, England, a British company
Filed Oct. 31, 1962, Ser. No. 234,364
6 Claims. (Cl. 23—140)

This invention relates to the manufacture of oxides of the elements titanium, zirconium, iron, aluminum and silicon by the oxidation of chlorides of those elements.

It has previously been proposed to manufacture titanium dioxide by reacting titanium tetrachloride with oxygen in the vapor phase, but difficulty has been experienced because at least a part of the titanium dioxide tends to be formed as a deposit on reactor surfaces that are exposed to contact with either the hot reactant mixture or the hot titanium dioxide produced by the reaction or both.

This deposition of titanium dioxide constitutes a serious difficulty for several reasons.

First, the deposited titanium dioxide is not in finely divided pigmentary form and when, as is usually the case, it is desired to produce pigmentary titanium dioxide, the formation of the deposited non-pigmentary titanium dioxide reduces the overall efficiency of the process.

Secondly, the build-up of deposited titanium dioxide can necessitate frequent interruption of the process in order to remove the deposited material before blockage occurs. The risk of blockage is especially great when the build-up of deposited titanium dioxide occurs in the region of a gas inlet through which one of the reactants is introduced into the reaction chamber.

Third, if the wall of the reaction chamber is made of a refractory material such as silica, even a thin layer of deposited titanium dioxide can cause the wall of the reaction chamber to crack as a result of differential contraction when the reactor is allowed to cool. Similar considerations apply if attempts are made to manufacture the other oxides referred to above by such a process.

This invention provides a process for the manufacture of an oxide of an element selected from the group consisting of titanium, zirconium, iron, aluminum and silicon by reacting a chloride of the element with an oxidizing gas in the vapor phase, which comprises preheating the chloride and the oxidizing gas to such a degree that if the chloride and the oxidizing gas were to be mixed without reaction taking place the temperature of the resultant mixture, hereafter called the "calculated mixed gas temperature," would be at least 700° C., introducing the preheated chloride vapor and the preheated oxidizing gas into a reaction chamber through separate inlet means in such manner as to produce a turbulent stream of intimately mixed gases wherein the oxide is formed in finely divided form, introducing an inert particulate refractory material into the reaction chamber, in such manner that the said particulate material impinges on the reactor surface or surfaces that are immediately adjacent to gas inlet means and accessible to both the reactants, to prevent or substantially reduce the deposition of product oxide on the said surface or surfaces, the said particulate material being at least substantially carried out of the reaction chamber in suspension in the turbulent gas stream, and thereafter separating the said particulate material from product oxide.

An especially important form of the process is that in which the product oxide is pigmentary titanium dioxide and the chloride is titanium tetrachloride.

The reason why the impingement of the inert particulate refractory material on the surfaces referred to should substantially reduce the deposition of product oxide on those surfaces is not fully understood, especially as, in the case of titanium dioxide, the layer of deposited titanium dioxide is harder than silica and yet the introduction of inert particulate material in a manner that does not cause appreciable wear of the walls of a reaction chamber or gas entry pipe made of silica will suffice to effect a substantial reduction in the deposition of titanium dioxide on the walls.

It is essential that the flow rate of the gaseous mixture within the oxidation reaction zone shall correspond to a Reynolds' flow number of at least 10,000 and preferably at least 20,000. When the reactants are introduced (as will be described hereinafter) through parallel inlets (especially non-coaxial parallel inlets), the flow rate of the gaseous mixture within the oxidation zone advantageously corresponds to a Reynolds' flow number of at least 50,000.

The inert particulate refractory material must be a hard solid that is not substantially attacked by chlorine at the elevated temperature and under the other conditions that obtain during the reaction. The material may be, for example, zircon particles, or alumina particles, or titanium dioxide particles that have been withdrawn from a fluidized bed of titanium dioxide particles used in a process for the manufacture of titanium dioxide by the vapor phase oxidation of titanium tetrachloride within the bed. Advantageously, the material is silica sand. The material may also be a mixture of more than one of these or other materials. Substantially all the particles may have a size of +85 mesh (B.S.S.). The practical upper limit of the particle size is determined in general by the requirement that the particulate refractory material shall be carried out of the reaction chamber by the gas stream. Advantageously, substantially all the particles have sizes within the range of from −8 to +30 mesh (B.S.S.).

The optimum rate of introduction of the inert particulate refractory material depends on the design and dimensions of the reactor and may be varied during the operation of the process. If the rate is high, the quantity of the material to be separated from the product oxide is correspondingly large and, when (as is described hereinafter) the material is introduced into the reaction chamber cold in a stream of carrier gas, undue cooling of the reactants may occur with consequent incomplete reaction.

The inert particulate refractory material should be introduced into the reaction chamber at a velocity of at least 75 feet per second, preferably at least 100 feet per second. The upper limit for the velocity of introduction of the inert particulate refractory material is determined by the requirement that the velocity should not be so high as to cause undue wear of the reactor surface or surfaces. Generally, the velocity of introduction of the particulate refractory material should not exceed about 300–400 feet per second.

Advantageously, the inert particulate refractory material is introduced into the reaction chamber at a temperature substantially below the temperatures at which the preheated oxidizing gas and the preheated chloride are introduced into the reaction chamber. There are two reasons for this. First, especially when the said reactor surfaces are not themselves indirectly cooled by the use of a coolant fluid that does not come into contact with the reactants (as is described hereinafter), the deposition of product oxide on such surfaces may not be so effectively reduced or prevented unless the particulate refractory material is, immediately before it impinges on the said surfaces, at a temperature substantially below the temperatures at which the preheated reactants are introduced into the reaction chamber. Secondly, if the particulate refractory material reaches too high a temperature (more than approximately 900° C. when the product oxide is titanium dioxide) before it leaves the reaction chamber, product oxide may be deposited on the particulate refractory material to an undesirable extent. On the other hand, it is important that the reactants shall not be unduly cooled by the introduction of the particulate refractory material. Also, when the particulate refractory material is material that has been recycled after separation from product oxide, some unreacted chloride may (especially if the efficiency of the reaction is considerably less than 100%) be absorbed on the material and the material should then not be cooled below the dewpoint of the chloride (thus, the material should not be cooled below a temperature of approximately 150° C. when the chloride is titanium tetrachloride, of which the dewpoint at atmospheric pressure is 136° C.) before it is reintroduced into the reaction chamber.

The particulate refractory material may be introduced into the reaction chamber in suspension in one or both of the preheated reactants, and/or in suspension in inert barrier gas which (as is described hereinafter) may be introduced into the reaction chamber. Alternatively, at least a part (and preferably the whole) of the particulate refractory material may be introduced into the reaction chamber in suspension in a stream or streams of carrier gas through inlet means separate from the inlet means for the preheated reactants, the carrier gas preferably being so directed as to cause the particulate refractory material to impinge directly on the reactor surfaces that are immediately adjacent to gas inlet means and accessible to both reactants.

When the particulate refractory material is introduced into the reaction chamber in suspension in one or both of the preheated reactants, it is usually preferable to introduce the material in suspension in the preheated oxidizing gas. Some form of seal has to be provided to prevent the gas from entering the supply system for the particulate refractory material, and it is easier to provide such a seal for the preheated oxidizing gas than for the preheated chloride, which is corrosive. Similar considerations can arise when the particulate refractory material is introduced in barrier gas when the barrier gas is chlorine, and also (as will be described hereinafter) the barrier gas inlets are usually much more restricted than the reactant inlets. When the particulate refractory material is introduced into the reaction chamber in suspension in one or both of the preheated reactants, it is preferably incorporated with the reactant or reactants at a point or points sufficiently close to the reactant inlet means for the particulate refractory material to enter the reaction chamber at a temperature substantially below the temperatures at which the preheated reactants enter the reaction chamber. As compared with the use of a carrier gas, the introduction of the particulate refractory material in suspension in one or both of the preheated reactants and/or in barrier gas has several advantages. First, it avoids the introduction of an additional gaseous component that may tend to cool the reactants unduly, that will slow down the reaction and absorb some of the heat of the reaction and that will, when the carrier gas is not chlorine, dilute the chlorine produced by the reaction, thereby making the chlorine harder to recover and less suitable for recycling directly to a chlorinator. Secondly, it avoids the need to provide additional inlet means and associated supply means for a carrier gas, and thus enables the reactor construction to be simplified. Third, it enables the particulate refractory material to be introduced where there is insufficient room to provide a carrier gas inlet (which must normally have an internal diameter of at least ¼ inch). In general these considerations are of greater importance with smaller reactors.

When the particulate refractory material is introduced into the reaction chamber in suspension in a carrier gas, the carrier gas may be an inert gas (that is to say, a gas that is inert to the reactants under the conditions of the reaction), for example, chlorine or nitrogen, or (except where the carrier gas inlet is situated within a chloride inlet) an oxidizing gas, advantageously, air. As compared with introducing the particulate refractory material in suspension in one or both of the preheated reactants and/or in barrier gas, the use of a carrier gas has several advantages. First it is possible to direct the stream or streams of carrier gas so that substantially all the particulate refractory material impinges directly on the reactor surfaces that are immediately adjacent to gas inlet means and accessible to both reactants. Thus, substantially all the particulate refractory material is usefully employed and it is possible to provide adequate coverage of the said reactor surfaces with a smaller quantity of particulate refractory material, which means that less product oxide is lost by deposition on the particulate refractory material and that the separation of the particulate refractory material from product oxide is facilitated. Secondly, it enables the particulate refractory material to be introduced into the reaction chamber at a temperature considerably lower than the temperatures at which preheated reactants are introduced into the reaction chamber. Thus, the carrier gas may be introduced into the reaction chamber at a temperature not greater than 150° C. In order to minimize the disadvantages associated with the introduction of a relatively cold carrier gas into the reaction chamber, the concentration of the particulate refractory material in the carrier gas should be high, say, about 0.2 pound of material per cubic foot of carrier gas. The advantages associated with the use of a carrier gas are generally of greater importance in large reactors and in reactors where the inner surface of the reactor wall is not indirectly cooled by the use of a coolant fluid (as is described hereinafter).

When the particulate refractory material is introduced into the reaction chamber in suspension in a carrier gas, the carrier gas may be introduced in a number of different ways depending on the design and type of the reactor.

In the case of a reactor in which the reaction chamber is generally cylindrical, one of the reactants (preferably the chloride) is introduced into the reaction chamber through one or more inlet openings in the side wall of the reaction chamber and the other reactant (preferably the oxidizing gas) is introduced into the reaction chamber at a point upstream of the said inlet opening or openings, the carrier gas containing the particulate refractory material in suspension may be introduced into the reaction chamber through a nozzle arranged coaxially within the chamber and upstream of the inlet opening or openings in the side wall of the chamber so that the conical spray of suspended particulate refractory material emerging from the nozzle impinges directly on the reactor surfaces adjacent to the inlet opening or openings in the side wall of the reactor.

In the case of a reactor in which the chloride and the oxidizing gas are introduced through inlets that are coaxial with one another, the carrier gas containing the particulate refractory material may be introduced through an inlet situated within the inner entry conduit and arranged to direct a conical spray of suspended particulate refractory material onto the inner surface of the end portion of the inner entry conduit. Instead, the carrier gas may be introduced through an annular inlet surrounding a chloride or oxidizing gas inlet and arranged to direct a converging stream of suspended particles onto the reactor surface immediately surrounding such chloride or oxidizing gas inlet. Further, these two arrangements may be combined so that the particulate refractory material is caused to impinge directly on both the inner and outer surfaces of the end portion of a reactant entry conduit. When the chloride inlet is the innermost inlet of two or more coaxial inlets, a conical spray of suspended particulate material may be caused to impinge directly on the inner surface of the end portion of the chloride entry conduit from an axially arranged carrier gas nozzle and, at the same time, particulate refractory material may be caused to impinge on the outer surface of the end portion of the chloride entry conduit by suspending some of the material in the preheated oxidizing gas and introducing the oxidizing gas into the reaction chamber through an annular inlet surrounding the chloride inlet. Numerous other variations are possible. Thus, for example, the central carrier gas nozzle giving a conical spray of suspended particulate refractory material may be replaced by a tangentially directed inlet giving a helically directed stream of the material.

In the case of a reactor in which the chloride and oxidizing gas are introduced through inlets of which the axes are parallel to one another, but which are situated side-by-side and not one within another, the carrier gas containing the suspended particulate refractory material may be introduced through one or more inlets arranged with their axes parallel to those of the reactant inlets and situated upstream of the reactant inlets. This arrangement may, if desired, be supplemented by introducing further particulate refractory material in suspension in the preheated oxidizing gas.

Where the design and dimensions of the reactor permit, each of the arrangements described hereinbefore for the introduction of the particulate refractory material may be replaced or supplemented by movable nozzle means for the carrier gas containing the particulate refractory material in suspension. Thus, a fixed nozzle giving a conical spray of suspended particulate refractory material may be replaced by a nozzle giving a stream of suspended particulate material, the nozzle being rotated continuously about an axis inclined at an acute angle (for example, equal to the semi-angle of the said conical spray) with respect to the axis of the substantial cylindrical stream of suspended particulate refractory material. Instead, such movable nozzle means may be arranged for intermittent operation to supplement fixed inlet means for the carrier gas, the arrangement being such that the nozzle means can be moved to direct particulate refractory material to a point selected by an operator. Thus, a supplementary stream of particulate refractory material may be directed to one or more different points at such time or times as observation or experience may suggest to be necessary or desirable.

Advantageously, the reactor surfaces that are accessible to the mixed reactants and/or to the hot product oxide are cooled indirectly by means of a coolant fluid. The reactor surfaces adjacent to the chloride inlet means and/or the oxidizing gas inlet means may also be cooled indirectly by means of a coolant fluid, for example, as described in British patent specification No. 764,082. The cooling of the reactor surfaces is beneficial for a number of reasons. First, the cooling of the surfaces tends of itself to prevent the deposition thereon of the product oxide. Secondly, such product oxide as may be deposited on the cooled reactor surfaces tends to be in a softer form than when deposited on uncooled reactor surfaces, and this facilitates the removal of such deposited product oxide by the particulate refractory material, even at points some distance downstream of the region of introduction of the particulate refractory material into the reaction chamber. As explained hereinbefore, it is advantageous that this material shall not reach too high a temperature because otherwise product oxide may be deposited on the refractory particles at an undesirably high rate. Thirdly, the cooling of reactor surfaces can enable at least a part of the reactor to be constructed of metal rather than of a non-metallic refractory material such as silica and, as is explained hereinafter, this is sometimes advantageous.

In order to enable the whole or a part of the reactor to be constructed of metal instead of a non-metallic refractory material, a considerable degree of cooling is required, depending upon the particular metal employed. In the case of nickel, for example, the reactor surface temperature must be cooled to a temperature below 325° C. The lowest temperature to which reactor surfaces can be cooled is determined (in the case of large reactors where there is no risk of premature quenching of the reacants) by the dewpoint of the chloride. Thus, for example, when the chloride is titanium tetrachloride, reactor surfaces must not be cooled to a temperature below 140° C. On the other hand, when the cooled reactor surface is made of a non-metallic refractory material, it is found that even a relatively small degree of cooling is beneficial, especially for parts of the surface that are a considerable distance downstream of the reactant inlet means and when the oxidizing gas is in excess of that required to react stoichiometrically with the chloride. Thus, if the reaction temperature is within the range of from 1,000° C. to 1,300° C. it is beneficial to cool reactor surfaces to a temperature below 900° C., advantageously below 800° C. and preferably not exceeding 650° C. The coolant fluid may be water, steam, oil or a molten metal salt or a molten mixture of metal salts (for example, a mixture consisting of 40% sodium nitrite, 7% sodium nitrate and 53% potassium nitrate by weight, and having a melting point of 141.2° C.), depending on the material of which the reactor, or the part of the reactor that is to be cooled is constructed. When the said material is a metal, any of these coolants may generally be used, but, when the said material is a non-metallic refractory material, only certain molten metal salts or certain molten mixtures of metal salts may generally be used.

Although, for the reasons given hereinbefore, it is desirable to cool the reactor surfaces that are exposed to the reactants and to the hot product oxide, care has to be taken not to cool the mixture of reactants below the minimum satisfactory reaction temperature and not to quench the reaction prematurely. Thus, the degree of cooling that can be used is dependent upon the diameter of the reactor.

As a further precaution to prevent or reduce the deposition of product oxide on reactor surfaces adjacent to reactant inlet means, at least one reactant inlet may be surrounded by and/or separated from either another reactant inlet or the inner surface of the reaction chamber wall by a barrier gas inlet through which a barrier gas that is inert to both reactants, preferably, chlorine produced by the reaction or nitrogen or like inert gases, is introduced into the reaction chamber. Advantageously, the barrier gas is introduced into the reaction chamber at a temperature of at least 150° C. and the velocity of the barrier gas immediately prior to its introduction into the reaction chamber is at least 100 feet per second (preferably about 300 feet per second). In order to prevent undue cooling of the reactants, especially when a small reactor is used, the barrier gas is preferably preheated to a temperature within the range of from 600° C. to 1,000° C.

Although the gases within the reaction chamber are in a turbulent condition, the barrier gas tends to prevent one reactant from coming into contact with the other reactant while the first reactant is still in contact with the reactant inlet through which it is introduced into the reactor. Thus, for example, the chloride may be introduced into ta stream of the oxidizing gas flowing within the reaction chamber through an inner pipe, which may either terminate flush with the inner surface of the reaction chamber wall or extend within the reaction chamber, and an inert barrier gas may be introduced into the reaction chamber through an outer pipe, which is coaxial with the inner pipe and which terminates level with the end of the inner pipe. With a suitable choice of flow rates for the barrier gas and the chloride and providing that the wall thickness of the inner pipe is not too great, the barrier gas largely prevents the chloride from coming into contact with the oxidizing gas in a region immediately adjacent to the annular end surface of the inner pipe, because the chloride and the barrier gas together substantially reduce the concentration of the oxidizing gas at that surface. Nevertheless, the introduction of a barrier gas around an inlet for one reactant is not to be considered as rendering reactor surfaces adjacent to that inlet inaccessible to the other reactant. Thus, the introduction of a barrier gas is additional to, and does not replace, the introduction of the particulate refractory material.

The introduction of a barrier gas may be employed in conjunction with a wide variety of arrangements of reactant inlet means. Thus, when the preheated chloride and the preheated oxidizing gas are introduced into the reaction chamber through inner and outer coaxial inlets, the barrier gas is advantageously introduced through a third coaxial inlet between the inner and outer coaxial reactant inlets and may also be introduced through an annular inlet surrounding the outer of the two reactant inlets. When the preheated oxidizing gas and the preheated chloride are introduced into the reaction chamber through inlets that are not situated one within the other, which inlets may be either parallel or inclined to one another, barrier gas may be introduced into the reaction chamber through an inlet or inlets surrounding the inlet or inlets for at least one of the reactants. When the oxidizing gas is caused to flow along the reaction chamber and chloride is introduced into the stream of oxidizing gas through a slot in the wall of the reaction chamber, the chloride may be fed first through an outer slot that is narrower than the slot in the wall of the reaction chamber to form a sheeted stream of the chloride and barrier gas may be introduced into the reaction chamber through the inner slot on each side of the sheeted stream of chloride.

The product oxide is advantageously separated from the inert particulate refractory material using a settling chamber, but dry or wet cyclones may be used either instead of or following the settling chamber. After it has left the reaction chamber, the inert particulate refractory material is advantageously cooled and, after separation from the product oxide, recycled to the reaction chamber.

It is important that the design of the reactor, the temperatures and the reactant flow rates are such that the reactants and the products of the reaction remain within the oxidation zone for a period that is long enough to ensure substantially complete reaction, but not so long as to cause undesirable particle growth of the product oxide. Usually, detention times within the range of from 0.02 to 10 seconds will be found to be suitable. When the oxidizing gas is substantially pure oxygen or oxygen-enriched air, however, the detention time can, under suitable conditions, be as low as 0.01 second. When the gaseous reaction products, with the product oxide in suspension, leave the oxidation zone, they are advantageously subjected to a quick cooling or quenching treatment to a temperature below 900° C. (preferably below 650° C.). This quenching of the reaction products may take place at a time within the range of from 0.01 to 10 seconds (preferably 0.05 to 5 seconds) from the time of introduction of the chloride into the oxidation zone. The quenching may be effected by mixing cooled product gas, for example, chlorine, with the product gas stream containing the product oxide in suspension, or by passing the products at high velocity through cooled tubes. The quenching may be effected by dispersing in the product gas stream a cold inert particulate refractory material, which is preferably the same as the particulate refractory material used to prevent or reduce the deposition of the product oxide on reactor surfaces. Advantageously, a portion of the separated particulate material is recycled to the reactor for use in preventing or reducing the deposition of the product oxide on reactor surfaces. Preferably, the inert particulate refractory material used for the quenching and the inert particulate refractory material introduced into the reaction chamber are carried upwardly by the product gas stream to means for separating the inert particulate refractory material from the gas stream and for cooling the separated inert particulate refractory material, a part of which is thereafter recycled under gravity to effect the quenching of further of the reaction products and a part of which is recycled to the reaction chamber.

A number of forms of apparatus suitable for carrying out the process of the invention will now be described by way of example in greater detail with reference to the accompanying drawings, in which:

FIGS. 11–17 are diagrammatic axial cross-sectional views of seven reactors, all provided with barrier gas inlets and indirect cooling of the reaction chamber wall.

Figure 1:
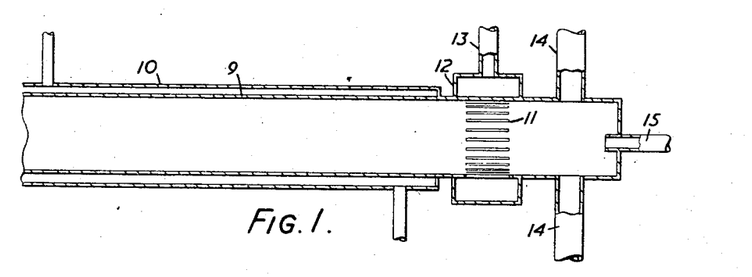
FIG. 1 is a diagrammatic axial cross-sectional view of a reactor with slotted inlets for one of the reactants.

The reactor shown in FIG. 1 of the drawings comprises a cylindrical reaction chamber 9, which need not necessarily be mounted with its axis horizontal as shown and which is provided with a jacket 10 through which a coolant fluid can be circulated to provide indirect cooling of the internal surface of the reaction chamber 9. The inlet means for one reactant (preferably the chloride) comprises a plurality of longitudinally extending slots 11, which are arranged at equal intervals around the circumference of the reaction chamber 9 and are surrounded by a supply manifold 12 fitted with a supply pipe 13 for that reactant.

The cooling jacket 10 terminates immediately downstream of the supply manifold 12. A short distance upstream of this inlet means, the reaction chamber is formed with two diametrically opposed inlets to which the other reactant (preferably the oxidizing gas) can be supplied through pipes 14.

A pipe 15, which is mounted coaxially with the reaction chamber 9, extends a short distance through the wall that closes the upstream end of the reaction chamber 9 and the arrangement is such that inert particulate refractory material fed through the pipe 15 in suspension in a carrier gas emerges in a conical spray which impinges directly on the inner surface of the reaction chamber around and between the slots 11. Owing to the very high flow rates used, the said two diametrically opposed inlets for the said other reactant are not accessible to the reactant that is introduced through the slots 11 and it is therefore not necessary to cause the inert particulate refractory material to impinge on the reactor surfaces adjacent to the said two diametrically opposed inlets.

Figure 2:
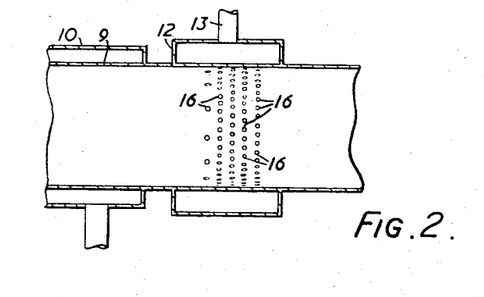
FIG. 2 is a diagrammatic axial cross-sectional view on an enlarged scale of a part of the reactor shown in FIG. 1, showing a modified arrangement of the inlets for the said one reactant.

Referring to FIG. 2 of the drawings, the slots 11 in the reactor shown in FIG. 1 may be replaced by an array of holes 16.

Another suitable form of halide inlet means for use with the reactor shown in FIG. 1 is that described in British patent specification No. 757,703 with reference to FIG. 1 of the drawings accompanying that specification, in which the inlet for one reactant (preferably the chloride) is in the form of a single circumferentially extending slot. The constructions described with reference to FIGS. 2 and 3 of the drawings accompanying British patent specification No. 757,703 may also be used, but the inert particulate refractory material has to be introduced in suspension in the said other reactant and modification of both the reactant halide supply systems shown in FIG. 1 of the accompanying drawings is required.

Figure 3:
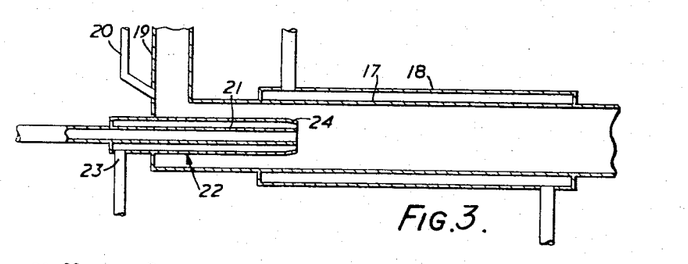
FIG. 3 is a diagrammatic axial cross-sectional view of a reactor with a barrier gas inlet.

The reactor shown in FIG. 3 of the drawings comprises a cylindrical reaction chamber 17, which need not necessarily be mounted with its axis horizontal as shown and which is provided with a jacket 18 through which a coolant fluid can be circulated to provide indirect cooling of the internal surface of the reaction chamber 17. In the side wall of the reaction chamber 17, adjacent to the upstream end thereof, there is provided an inlet opening to which one of the reactants (preferably the oxidizing gas) can be supplied through a supply pipe 19. Immediately before the supply pipe 19 meets the reaction chamber 17, it is provided with an inlet through which there can be injected into that reactant from a smaller diameter pipe 20 a suspension of an inert particulate refractory material in a carrier gas. Two pipes 21 and 22, which are mounted coaxially with respect both to one another and to the reaction chamber 17, extend through the upstream end wall of the reaction chamber and into the reaction chamber to a point some distance downstream of the upstream end of the cooling jacket 18. The inner pipe 21 serves as the inlet means for the other reactant (preferably the chloride) and a barrier gas is fed from a supply pipe 23 into the region of annular cross-section that is defined by the two pipes 21 and 22. The end portion 24 of the outer pipe 22 is tapered to increase the velocity of the barrier gas before it enters the reaction chamber 17. The particulate refractory material becomes entrained in the first-mentioned reactant and impinges on the outer surface of the pipe 22, of which the end portion is adjacent to the inlet for the said other reactant, and on the surface of the reaction chamber 17.

Figure 4:
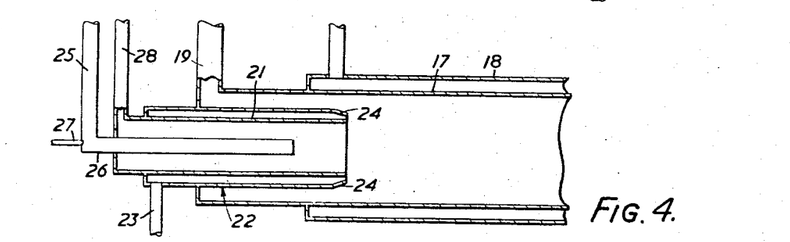
FIG. 4 is a diagrammatic axial cross-sectional view of the reactor shown in FIG. 3 with a modified arrangement for introducing the inert particulate refractory material.

The arrangement for introducing the inert particulate refractory material into the reactor shown in FIG. 3 may be modified as shown in FIG. 4, wherein the particulate refractory material is fed through a pipe 25 to a pipe 26, which is mounted coaxially within the inlet pipe 21, and into which a carrier gas can be injected through a smaller diameter pipe 27. A conical spray of the particulate refractory material suspended in the carrier gas emerges from the pipe 26, which terminates short of the pipe 21 so that the spray impinges directly on the inner surface of the end portion of the inner pipe 21. One reactant (preferably the chloride) is supplied to the pipe 21 through a supply pipe 28.

Figure 5:
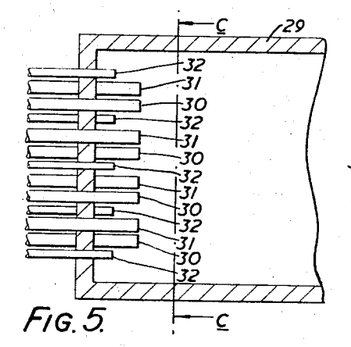
FIG. 5 is a diagrammatic axial cross-sectional view of a reactor with parallel, non-coaxial, reactant entry pipes.
Figure 6:
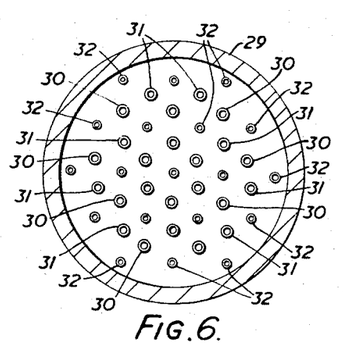
FIG. 6 is a cross-sectional view taken on the line C—C in FIG. 5.

The reactor shown in FIGS. 5 and 6 of the drawings comprises a cylindrical reaction chamber 29, which need not necessarily be mounted with its axis horizontal as shown in FIG. 5. Extending through the end wall of the reaction chamber 29 in a direction parallel to the axis of the reaction chamber 29 are twelve inlet pipes 30 for one reactant, say, the oxidizing gas, twelve similar inlet pipes 31 for the other reactant, say, the chloride and nineteen smaller diameter inlet pipes 32 for the introduction of an inert particulate refractory material suspended in a carrier gas. The reactant inlet pipes 30 and 31 all terminate in a plane perpendicular to the axis of the reaction chamber 29 and the inlet pipes 32 terminate in a plane, which is parallel to and upstream of the first-mentioned plane. The separation between these two planes is so selected relatively to the separation between the axes of the pipes 30, 31 and 32, which is shown in FIG. 6, together with the arrangement of the different types of pipes 30, 31 and 32 over the area of the reaction chamber 29, that the conical sprays of inert particulate refractory material suspended in carrier gas that emerge from the inlet pipes 32 impinge directly on the outer surfaces of the end portions of the reactant inlet pipes 30 and 31, and on the adjacent part of the surface of the side wall of the reaction chamber 29. Subsequently, the particulate refractory material impinges on the surface of the wall of the reaction chamber 29 along its length downstream of the reactant inlet pipes 30 and 31. If desired, the reaction chamber 29 may be provided with a jacket through which a coolant fluid can be passed to provide indirect cooling of the inner surface of the side wall of the reaction chamber 29.

Figure 7:
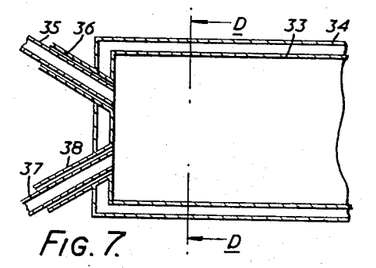
FIG. 7 is a diagrammatic axial cross-sectional view of a reactor with barrier gas inlets and indirect cooling of the reaction chamber wall.
Figure 8:
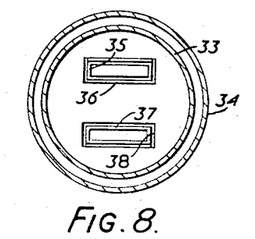
FIG. 8 is a cross-sectional view taken on the line D—D in FIG. 7.

The reactor shown in FIGS. 7 and 8 of the drawings comprises a cylindrical reaction chamber 33, which need not necessarily be mounted with its axis horizontal as shown in the drawings and which is provided with a jacket 34 through which a coolant fluid can be circulated to provide indirect cooling of the inner surface of the reaction chamber 33. The end wall of the reaction chamber is formed with two rectangular slots which, as can be seen in FIG. 8, extend parallel to one another. Leading to one of the slots is a pair of coaxial conduits 35 and 36 of which the inner conduit 35 is an inlet conduit for one of the reactants and the region between the inner conduit 35 and the outer conduit 36 enables a barrier gas to be introduced into the reaction chamber 33 surrounding that reactant. Leading to the other slot is a similar pair of coaxial conduits 37 and 38 of which the inner conduit 37 is an inlet conduit for the other reactant and the region between the inner conduit 37 and the outer conduit 38 enables a barrier gas to be introduced into the reaction chamber 33 surrounding that other reactant. As can be seen from FIG. 7, the two pairs of coaxial conduits 35, 36 and 37, 38 are so inclined that the two reactants (chloride and oxidizing gas) are directed towards one another within the reaction chamber 33. Inert particulate refractory material is introduced into the reaction chamber 33 through each of the slots, and this material is preferably entrained in the two reactants, but it may be supplied, either in addition to or instead of that supplied in suspension in a reactant, in suspension in the stream of barrier gas surrounding that reactant.

Figure 9:
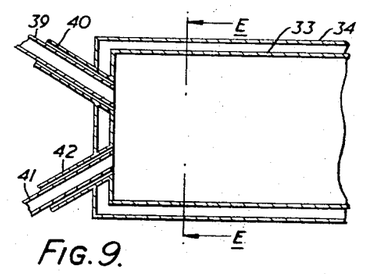
FIG. 9 is a diagrammatic axial section of the reactor shown in FIG. 7, with a modified arrangement of reactant inlets.
Figure 10:
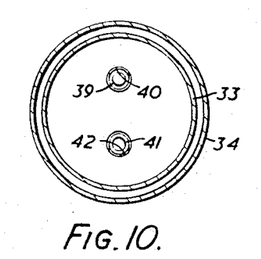
FIG. 10 is a cross-sectional view taken in the direction of the arrows E—E in FIG. 9.

As shown in FIGS. 9 and 10, the rectangular slot inlets and associated pairs of coaxial conduits 35, 36 and 37, 38 may be replaced by circular inlets and associated pairs of coaxial pipes 39, 40 and 41, 42 respectively.

Figure 11:
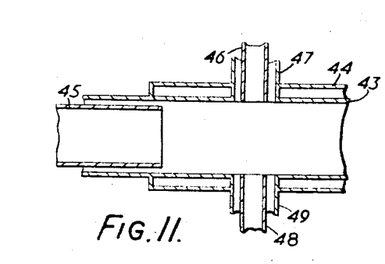

The reactor shown in FIG. 11 of the drawings comprises a cylindrical reaction chamber 43, which need not necessarily be mounted with its axis horizontal as shown in the drawings and which is provided with a jacket 44 through which a coolant fluid can be passed to provide indirect cooling of the interior surface of the reaction chamber 43. The upstream end of the reactor is open and a pipe 45, of which the external diameter is only a little less than the internal diameter of the reaction chamber 43, extends coaxially within the reaction chamber 43 to a point a short distance downstream of the upstream end of the cooling jacket 44. The pipe 45 serves as an inlet for one of the reactants (preferably the oxidizing gas) and also for inert particulate refractory material suspended in that reactant. The region between the internal surface of the reaction chamber 43 and the outer surface of the pipe 45 serves as an inlet for barrier gas. Two pairs of coaxial pipes 46, 47 and 48, 49 lead to two diametrically opposed inlets in the side wall of the reaction chamber 43. The inner pipes 46 and 48 serve as inlets for the other reactant (preferably the chloride), which can have entrained in it further inert particulate refractory material. The region between the outer surface of the inner pipe 46 or 48 of each pair and the inner surface of the outer pipe 47 or 49 of that pair serve as an inlet for barrier gas.

Figure 12:
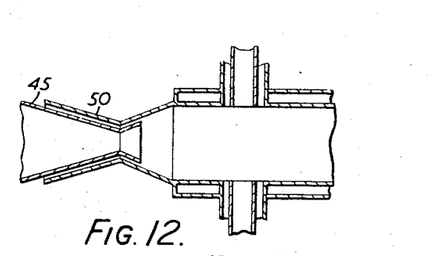

The reactor shown in FIG. 12 of the drawings is similar to that shown in FIG. 11 except that the upstream end portion of the reaction chamber 43 is of double frusto-conical form so that it has a waist or constriction 50, the pipe 45 being shaped correspondingly. Also, the cooling jacket 44 does not extend as far upstream as the end of the pipe 45.

Figure 13:
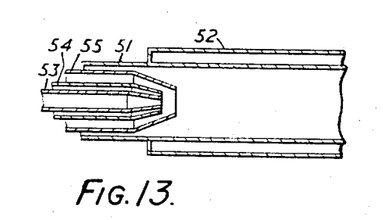

The reactor shown in FIG. 13 of the drawings comprises a cylindrical reaction chamber 51, which need not necessarily be mounted with its axis horizontal as shown in the drawings and which is provided with a jacket 52 through which a coolant fluid can be passed to provide indirect cooling of the internal surface of the reaction chamber 51. Extending into the reaction chamber 51 through the open upstream end thereof are three pipes 53, 54 and 55, which are coaxial with one another and with the reaction chamber 51. The end portions of the pipes 53, 54 and 55 are tapered, the innermost pipe 53 having the smallest degree of taper and the outermost pipe 55 having the largest degree of taper. The two inner pipes 53 and 54 extend the same distance into the reaction chamber 51, but the outermost pipe extends beyond the two inner pipes 53 and 54. The innermost pipe 53 serves as an inlet for one of the reactants, preferably the chloride, the region between the innermost pipe 53 and the pipe 54 serves as an inlet for the introduction of barrier gas, the region between the pipe 54 and the outermost pipe 55 serves as an inlet for the other reactant, preferably the oxidizing gas, and the region between the outermost pipe 55 and the wall of the reaction chamber 51 serves as an inlet for the introduction of further barrier gas. Inert particulate refractory material is introduced into the reaction chamber 51 in suspension in the reactant that is fed between the pipes 54 and 55 and may also be intoduced in suspension in the other reactant and/or in the barrier gas.

Figure 14:
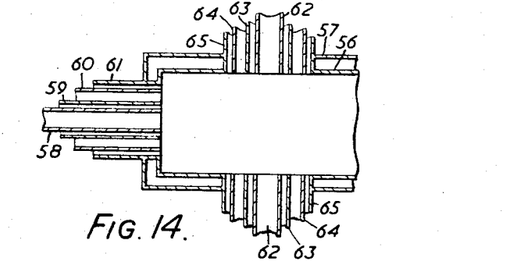

The reactor shown in FIG. 14 of the drawings comprises a cylindrical reaction chamber 56, which need not necessarily be mounted with its axis horizontal as shown in the drawings and which is provided with a jacket 57 through which a coolant fluid can be passed to provide indirect cooling of the internal surface of the reaction chamber 56. Four pipes 58, 59, 60 and 61, which are coaxial with one another and with the reaction chamber 56, lead to a circular opening in the upstream end wall of the reaction chamber. The innermost pipe 58 serves as an inlet for one of the reactants (preferably the chloride) the region between the innermost pipe 58 and the next pipe 59 serves as an inlet for the introduction of barrier gas, the region between the pipe 59 and the next outer pipe 60 serves as an inlet for the other reactant (preferably the oxidizing gas) and the region between the pipe 60 and the outermost pipe 61 serves as an inlet for the introduction of further barrier gas. Some distance downstream of the end wall of the reaction chamber 56, two diametrically opposite circular openings are formed in the side wall of the chamber and leading to each of these openings is a set of four coaxial pipes 62, 63, 64 and 65, the axes of these two sets of pipes being coincident. In the case of each of these two sets of pipes, the innermost pipe 62 serves as an inlet for one of the reactants, preferably the chloride, the region between the innermost pipe 62 and the next pipe 63 serves as an inlet for the introduction of barrier gas, the region between the pipe 63 and the next outer pipe 64 serves as an inlet for the other reactant, preferably the oxidizing gas, and the region between the pipe 64 and the outermost pipe 65 serves as an inlet for the introduction of further barrier gas. In respect of each of the three sets of coaxial inlets, the cross-sectional areas of the two barrier gas inlets are approximately the same and are considerably smaller than the cross-sectional areas of the reactant inlets. Inert particulate refractory material is introduced in suspension in the reactant that is fed through the outer reactant inlet of each set of coaxial inlets, that is to say, through the three annular inlets through which the oxidizing gas is preferably fed. Additional refractory particulate material may be introduced in suspension in the reactant that is fed through the inner reactant inlet of each set of coaxial inlets and/or in suspension in the barrier gas.

The reactor shown in FIG. 14 of the drawings may be modified in that there may be provided more than two sets of transversely directed inlets, each with its own set of four coaxial pipes similar to the pipes 62 to 65 associated with each of the two sets of transversely directed inlets shown in FIG. 14, arranged at equal intervals around the circumference of the reaction chamber 56. Thus, for example, there could be three such sets of transversely directed inlets arranged at intervals of 120° about the axis of the reaction chamber 56 or four such sets of inlets arranged at intervals of 90° about that axis.

Figure 15:
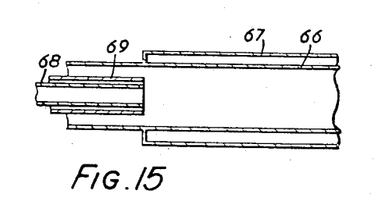

The reactor shown in FIG. 15 of the drawings comprises a cylindrical reaction chamber 66, which need not necessarily be mounted with its axis horizontal as shown in the drawings and which is provided with a jacket 67 through which a coolant fluid can be passed to provide indirect cooling of the internal surface of the reaction chamber 66. Extending through the open upstream end of the reaction chamber 66 are two pipes 68 and 69, which are coaxial with one another and with the reaction chamber 66 and which terminate at the upstream end of the cooling jacket 67. The inner pipe 68 serves as an inlet for one of the reactants, preferably the chloride, the region between the two pipes 68 and 69 serves as an inlet for barrier gas, and the region between the outer pipe 69 and the inner surface of the reaction chamber 66 serves as an inlet for the other reactant, preferably the oxidizing gas. The cross-sectional area of the barrier gas inlet is considerably smaller than the cross-sectional area of either of the two reactant inlets. Inert particulate refractory material is introduced in suspension in the reactant that is fed through the outer reactant inlet, that is to say, through the region between the outer pipe 69 and the inner surface of the reaction chamber 66. Additional inert particulate refractory material may be introduced in suspension in the reactant that is fed through the inner pipe 68 and/or in suspension in the barrier gas.

The reactor shown in FIG. 16 of the drawings comprises a cylindrical reaction chamber 70, which need not necessarily be mounted with its axis horizontal as shown in the drawings and which is provided with a jacket 71 through which a coolant fluid can be passed to provide indirect cooling of the internal surface of the reaction chamber 70. Extending through the open upstream end of the reaction chamber 70 are three pipes 72, 73 and 74, which are coaxial with one another and with the reaction chamber 70 and which terminate at the upstream end of the cooling jacket 71. The innermost pipe 72 serves as an inlet for one of the reactants, preferably the chloride, the region between the innermost pipe 72 and the next pipe 73 serves as an inlet for barrier gas, the region between the pipe 73 and the outer pipe 74 serves as an inlet for the other reactant, preferably the oxidizing gas, and the region between the outer pipe 74 and the inner surface of the reaction chamber 70 serves as an inlet for further barrier gas. The cross-sectional area of each of the two barrier gas inlets is considerably smaller than the cross-sectional area of either of the two reactant inlets. Inert particulate refractory material is introduced in suspension in the reactant that is fed through the outer reactant inlet, that is to say, through the region between the pipes 73 and 74. Additional inert particulate refractory material may be introduced in suspension in the reactant that is fed through the innermost pipe 72 and/or in suspension in the barrier gas.

Figure 17:
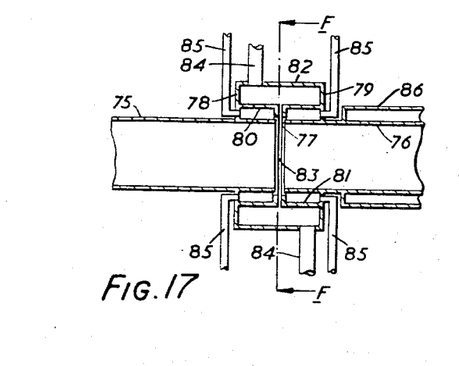
Figure 18:
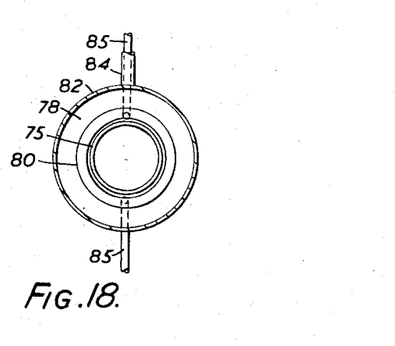
FIG. 18 is a cross-sectional view taken on the line F—F in FIG. 17.

The reactor shown in FIGS. 17 and 18 of the drawings comprises a cylindrical reaction chamber, which is made up of two parts 75 and 76, which are separated from one another to form a circumferential slot 77. The reactor need not necessarily be mounted with its axis horizontal as shown in the drawings. Two annular flanges 78 and 79 extend outwardly from the parts 75 and 76, respectively, of the reaction chamber, being arranged equidistantly from the center of the slot 77. Extending between the two annular flanges 78 and 79 are two inner cylindrical flanges 80 and 81, and an outer cylindrical flange 82, all the cylindrical flanges 80, 81 and 82 being coaxial with the reaction chamber. The two inner cylindrical flanges are similar to one another and are separated to form a circumferential slot 83, the center line of which is coplanar with the center line of the circumferential slot 77 and which is narrower than the slot 77. The two annular flanges 78 and 79 and the cylindrical flanges 80, 81 and 82 together form a manifold into which one of the reactants, preferably the chloride, is supplied through two pipes 84, which are offset longitudinally in opposite directions with respect to the slot 83. This reactant issues from the slot 83 in the form of a sheeted stream which flows radially inwards through the broader slot 77 towards the axis of the reaction chamber 75, 76. Each of the annular flanges 78 and 79 is formed, at two diametrically opposite positions, with inlet openings through which barrier gas is admitted from four pipes 85 into the region bounded by the two annular flanges 78 and 79, the two inner cylindrical flanges 80 and 81, and the reaction chamber 75, 76. The barrier gas passes into the reaction chamber through the slot 77 on each side of the sheeted stream of reactant issuing from the slot 83 and so tends to prevent that reactant from coming into contact with the adjacent annular end faces of the parts 75, 76 of the reaction chamber. The other reactant, preferably the oxidizing gas, is introduced into the open upstream end of the upstream part 75 of the reaction chamber. The downstream part 76 of the reaction chamber is surrounded up to a point immediately downstream of the two downstream barrier gas supply pipes 85 by a jacket 86 through which a coolant fluid can be passed to provide indirect cooling of the internal surface of the downstream part of the reaction chamber 76. Inert particulate refractory material is introduced in suspension in the reactant that is fed through the open upstream end of the reaction chamber.

The reactants are advantageously preheated to such a degree that, if they were to be mixed without reaction taking place, the temperature of the reactant mixture would be within the range of from 850° C. to 1,100° C. (preferably within the range of from 950° C. to 1,050° C.) when the chloride is titanium tetrachloride. The optimum degree of preheat depends in part on the quantities and the temperatures of other gases, for example, carrier gas for the inert particulate refractory material and inert barrier gas, introduced into the reaction chamber, the introduction of quantities of cool gas making a higher degree of preheat of the reactants desirable. The oxidizing gas may be preheated directly by incorporating with it a hot gaseous combustion product obtained by burning a fuel gas, for example, carbon monoxide, but each of the reactants, especially the chloride, is advantageously preheated indirectly, that is to say, by passing the reactant through a heated tube or other heat-exchange means. If desired, the oxidizing gas may be both directly and indirectly preheated. The reactants may instead be preheated by means of pebble heaters.

The oxidizing gas advantageously comprises molecular oxygen and it may consist of substantially pure oxygen or of oxygen in admixture with an inert gas or gases, for example, air or oxygen-enriched air or ozone.

The choice of the oxidizing gas depends primarily upon the chloride and upon the internal dimensions of the reaction chamber in a direction transverse to the longitudinal axis of the reaction chamber. Other relevent factors are the degree to which the reactants are preheated and the temperature to which the internal surface of the metal part of the reaction chamber is cooled. The proportion of oxygen in the oxidizing gas is one of the factors that determines the maximum temperature reached by the gaseous mixture in the reaction zone and the temperature distribution along the length of the reaction zone. An increase in the proportion of oxygen tends to result in an increase in the maximum temperature and in the temperature falling off less quickly along the length of the reaction zone. When the chloride is titanium tetrachloride and the internal dimensions of the reaction chamber in a direction transverse to its longitudinal axis are small, for example, when the reaction chamber is cylindrical and has an internal diameter of four inches or less, there is a risk that the reaction will be prematurely quenched if the oxidizing gas is air, and it is then necessary to use an oxidizing gas containing a higher proportion of oxygen, for example, oxygen-enriched air or substantially pure oxygen. The risk of premature quenching of the reaction is greater when the temperature to which the internal surface of the metal part of the reaction chamber is cooled is lower, but this factor is usually less important than the internal dimensions of the reaction chamber, because, as is explained herein, the permissible range of temperatures for the cooled internal surface of the metal part is relatively small. The risk of premature quenching can be diminished by increasing the degree of preheat of the reactants, but the use of very high degrees of preheat leads to technical difficulties.

The rate of introduction of oxidizing gas into the reaction chamber may be within the range of ±10% of that required to react stoichiometrically with the chloride and is advantageously within the range of ±5% of that rate and preferably substantially equal to the rate required to react stoichiometrically with the chloride. For this purpose, both the preheated oxidizing gas and any oxidizing gas introduced into the reaction chamber as a carrier gas for the inert particulate refractory material must be taken into account.

Advantageously, there is introduced into the oxidation zone a quantity of water vapor within the range of from 0.05 to 10% (preferably 0.1 to 3%) by volume based on the total volume of gas introduced into the oxidation zone (the term gas being used throughout to include a vapor). The water vapor is preferably introduced into the oxidation zone in admixture with the oxidizing gas. When the oxidizing gas is the oxygen contained in atmospheric air, it may be found that the air contains sufficient moisture so that no moisture need be added. If the air is scrubbed to remove gaseous impurities, this may be done in such manner as to leave the quantity of water vapor contained in the air unchanged or so as to increase the quantity of water vapor contained in the air. When the inert particulate refractory material is introduced in suspension in a carrier gas, moisture may be introduced in suspension in the carrier gas, but this is not usually desirable unless the arrangement is such that the carrier gas does not come into contact with the chloride before the chloride mixes with the oxidizing gas.

Various conditioners and other agents may be introduced into the oxidation zone. Thus, for example, when the chloride is titanium tetrachloride and the product oxide is titanium dioxide, aluminum oxide may be formed within the reactor and incorporated with the product titanium dioxide to aid the formation of rutile, to improve other pigmenting properties (for example, anti-yellowing in stoving finishes) and to render the pigment neutral in reaction after suitable removal of chlorides (for example, by degassing at a temperature of 600° C.), the quantity of aluminum oxide being within the range of from 0.5% to 10%, advantageously 0.5% to 4% and preferably from 1% to 2.5% by weight based on the weight of the titanium dioxide product. The aluminum oxide may be formed by incorporating aluminum chloride vapor with the titanium terachloride vapor. The aluminum oxide may instead be formed by incorporating powdered aluminum metal with the inert particulate refractory material or by introducing powdered aluminum metal in suspension in the titanium tetrachloride vapor.

Also, when the chloride is titanium tetrachloride and the product is titanium dioxide, silicon tetrachloride may be introduced into the oxidation zone to control the particle size of the product titanium dioxide, the quantity of silicon tetrachloride (calculated as $SiO_2$) being within the range of from 0.05% to 1.0% preferably from 0.1% to 0.5%, by weight based on the weight of the product titanium dioxide. Titanium oxychlorides, finely divided oxides (for example, aluminum oxide and silica oxide), organic compounds (for example, hydrocarbons), and titanium esters, which act as nuclei or provide material for nucleation, may also be introduced into the oxidation zone.

In addition to the form of the process in which the product oxide is pigmentary titanium dioxide and the chloride is titanium tetrachloride, other important forms of the process are that in which the product oxide is ferric oxide and the chloride is ferric chloride, and that in which the product oxide is silica and the chloride is silicon tetrachloride.

Titanium dioxide was produced by a vapor phase reaction between a preheated oxidizing gas and preheated titanium tetrachloride vapor using the reactor shown in FIG. 1 of the drawings, but with the pipe 15 replaced by a pipe having an exit end portion reduced in diameter as compared with the main portion, the said portions being connected by a tapered portion. The reactor is constructed entirely of silica.

Referring to FIG. 1 of the drawings, the internal diameter of the reaction chamber 9 was two inches, the length of the reaction chamber 9 was approximately eight feet, the internal diameter of the supply pipes 13 and 14 was ¾ inch, the axes of the supply pipes 14 were situated three inches from the upstream end wall of the reaction chamber. The supply manifold 12 was four inches long and had an internal diameter of 3½ inches, and there were six slots 11, each 2¼ inches long by ½₂ inch wide.

Liquid titanium tetrachloride was vaporized in a stainless steel boiler and the resulting vapor was heated to a temperature of 1,020° C. by passing it through a preheater which consisted of silica tubing heated externally by means of town gas. The preheated titanium tetrachloride vapor, which contained 1.2% of aluminum chloride (calculated as $Al_2O_3$) based on the weight of the titanium tetrachloride (calculated as $TiO_2$), was fed through the supply pipe 13 to the manifold 12 at a rate of 300 pounds per hour. The velocity of the titanium tetrachloride vapor as it passed through the slots 11 immediately prior to its entry into the reaction chamber 9 was estimated to be approximately 90 feet per second.

Oxygen was preheated to a temperature of 1,000° C. in a preheater which consisted of silica tubing heated externally by means of town gas and was fed to the reaction chamber 9 through the opposed supply pipes 14 at the rate of 470 cubic feet per hour (measured at N.T.P.). The oxygen contained 2.75% by volume of water vapor based on the total volume of gas introduced into the reaction chamber 9.

Silica sand consisting of particles having sizes within the range of from −10 to +40 mesh (B.S.S.) was introduced into the reaction chamber 9 through the pipe 15 by means of compressed oxygen. The pressure of this oxygen was 60 pounds per square inch gauge and it was fed through the pipe 15 at a rate of 160 cubic feet per hour (measured at N.T.P.). The rate of supply of the sand, which was controlled by a vibratory feeder, was 100 pounds per hour, so that the concentration of the sand in the carrier oxygen was 0.625 pound of sand per cubic foot (measured at N.T.P.) of the carrier oxygen. The temperature of the mixture of sand and carrier oxygen immediately prior to its introduction into the reaction chamber 9 was 300° C. and it was estimated that the velocity of the mixture at that point was approximately 283 feet per second.

A molten salt mixture consisting of 40% sodium nitrite, 7% sodium nitrate and 53% potassium nitrate by weight, and having a melting point of 142.2° C., was continuously circulated through the jacket 10 and through a heat exchanger in which the salt mixture was cooled. In this way the temperature of the inner surface of the wall of the reaction chamber 9 was kept down, over the length of the jacket 10, to an estimated 650° C.

The gases leaving the reaction chamber 9 contained both the silica sand and product titanium dioxide in suspension.

The gas stream containing the product titanium dioxide in suspension was passed through a conventional separating system comprising cyclones and bag filters in order to separate the titanium dioxide product from the gases.

The titanium dioxide product was treated and the final product had a tinting strength of 1,600 (Reynolds' scale) an average particle size of 0.32 micron and was wholly in the rutile form.

We claim:

1. A process for the manufacture of an oxide of an element selected from the group consisting of titanium, zirconium, iron, aluminum and silicon by the vapor phase oxidation of a chloride of the element with an oxidizing gas in an elongated reaction zone having separate inlets at one end and an open exit end opposite said entrance end which comprises, preheating said chloride and oxidizing gas in such manner that when they are combined they have a calculated mixed gas temperature of at least 700° C., introducing the preheated chloride vapor and the preheated oxidizing gas through the inlets of said reaction zone in such manner as to produce a turbulent stream of intimately mixed gases wherein the oxide is formed in finely divided form and of which the flow rate corresponds to a Reynolds' flow number of at least 10,000, introducing a particulate refractory material into the entrance end of said reaction zone in such manner that said particulate material immediately impinges upon the surfaces of said zone immediately adjacent to said inlets and that substantially all said particulate material is carried out of the reaction zone through the opposite open exit end in suspension in the turbulent gas stream in admixture with the product oxide, and separating the said particulate material from product oxide outside the reaction zone.

2. A process as set forth in claim 1, wherein the inert particulate refractory material is at least one material selected from the group consisting of silica sand, zircon, alumina and titanium dioxide.

3. A process as set forth in claim 1, wherein the inert particulate refractory material is silica sand.

4. A process as set forth in claim 1, wherein substantially all the particles of the inert particulate refractory material have sizes within the range of from −8 to +30 mesh (B.S.S.).

5. A process as set forth in claim 1, wherein the inert particulate refractory material is introduced into the reaction zone in a stream of carrier gas.

6. A process as set forth in claim 1, wherein the inert particulate refractory material is introduced into the reaction zone in a stream of carrier gas that is inert to both the reactants.

References Cited

UNITED STATES PATENTS

| | | | |
|---|---|---|---|
| 2,503,788 | 4/1950 | White | 23—284 |
| 2,721,626 | 10/1955 | Rick | 23—202 X |
| 2,774,661 | 12/1956 | White | 75—9 |
| 2,791,490 | 5/1957 | Willcox | 23—202 |
| 2,968,529 | 1/1961 | Wilson | 23—202 |
| 3,022,137 | 2/1962 | Nelson | 23—202 |

FOREIGN PATENTS

| | | |
|---|---|---|
| 764,082 | 12/1956 | Great Britain. |
| 794,666 | 5/1958 | Great Britain. |
| 866,363 | 4/1961 | Great Britain. |

OTHER REFERENCES

Chem. Eng. Progress, vol. 49, No. 10, page 529 (1953).

MILTON WEISSMAN, Primary Examiner.

EDWARD STERN, OSCAR R. VERTIZ, Examiners.